(12) United States Patent
Han et al.

(10) Patent No.: US 10,212,416 B2
(45) Date of Patent: Feb. 19, 2019

(54) MULTI VIEW IMAGE DISPLAY APPARATUS AND CONTROL METHOD THEREOF

(71) Applicant: SAMSUNG ELECTRONICS CO., LTD., Suwon-si (KR)

(72) Inventors: Seung-ryong Han, Yongin-si (KR); Jin-mo Kang, Suwon-si (KR); Ho-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 420 days.

(21) Appl. No.: 15/018,035

(22) Filed: Feb. 8, 2016

(65) Prior Publication Data

US 2017/0094266 A1 Mar. 30, 2017

(30) Foreign Application Priority Data

Sep. 24, 2015 (KR) ........................ 10-2015-0135685

(51) Int. Cl.
| | | |
|---|---|---|
| *G06K 9/00* | (2006.01) | |
| *H04N 13/351* | (2018.01) | |
| *H04N 13/167* | (2018.01) | |
| *H04N 13/302* | (2018.01) | |
| *H04N 13/305* | (2018.01) | |
| *H04N 13/324* | (2018.01) | |
| *H04N 13/31* | (2018.01) | |
| *H04N 13/317* | (2018.01) | |
| *H04N 13/398* | (2018.01) | |
| *H04N 13/00* | (2018.01) | |

(52) U.S. Cl.
CPC ......... *H04N 13/351* (2018.05); *H04N 13/167* (2018.05); *H04N 13/302* (2018.05); *H04N 13/305* (2018.05); *H04N 13/31* (2018.05); *H04N 13/317* (2018.05); *H04N 13/324* (2018.05); *H04N 13/398* (2018.05); *H04N 2013/0081* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0048354 | A1* | 3/2003 | Takemoto | ............ H04N 13/312 348/51 |
| 2006/0033732 | A1* | 2/2006 | Fukushima | .......... H04N 13/305 345/419 |
| 2011/0081042 | A1* | 4/2011 | Kim | ..................... H04N 13/128 382/100 |

(Continued)

*Primary Examiner* — Sathyanaraya V Perungavoor
*Assistant Examiner* — Howard D Brown, Jr.
(74) *Attorney, Agent, or Firm* — Sughrue Mion, PLLC

(57) ABSTRACT

A multi view image display apparatus and a control method thereof are provided. The display apparatus includes an image inputter configured to receive an image, a display configured to display a multi view image that is generated based on the received image, and a processor configured to render views having different viewpoints based on a depth of the received image, expand a normal viewing area based on a cyclic mapping, adjust pixel values of the views so that a view jumping amount of a view jumping area occurring on a reverse viewing area due to the expansion of the normal viewing area is equal to a value, and generate the multi view image based on the adjusted pixel values.

20 Claims, 29 Drawing Sheets

(56) References Cited

U.S. PATENT DOCUMENTS

2012/0038641 A1* 2/2012 Levantovsky ....... H04N 13/183
   345/424
2012/0327077 A1* 12/2012 Tung .................. H04N 13/0022
   345/419
2015/0130793 A1* 5/2015 Han ..................... H04N 13/351
   345/419

* cited by examiner

RELATED CYCLIC MAPPING

ON-TIME AREA EXPANSION EXAMPLE 1

ON-TIME AREA EXPANSION EXAMPLE 2

PREVIOUS VIEW SMOOTHING

POSTERIOR VIEW SMOOTHING $a_{in} > a_{th}$ $a_{in} \leftarrow a_{th}$

VIEW SMOOTHING

MULTI VIEW IMAGE DISPLAY APPARATUS AND CONTROL METHOD THEREOF

CROSS-REFERENCE TO RELATED APPLICATION

This application claims priority from Korean Patent Application No. 10-2015-0135685, filed on Sep. 24, 2015 in the Korean Intellectual Property Office, the disclosure of which is incorporated herein by reference in its entirety.

BACKGROUND

1. Field

Apparatuses and methods consistent with exemplary embodiments relate to a multi view image display apparatus and a control method thereof, and more specifically, to a glasses-free multi view image display apparatus and a control method thereof.

2. Description of the Related Art

Supported by the development of electronic technology, various types of electronic devices have been developed and provided. A display apparatus such as television (TV), which may be used at home, has been developed at full speed.

While the display apparatus has been enhanced to provide high quality performance, the types of the contents displayed on the display apparatus have become diversified and expanded. A three-dimensional (3D) display system in which 3D contents can be viewed, has been recently developed and provided.

The 3D display apparatus may be implemented as various types of display apparatuses such as not only the 3D television used for most families, but also various types of monitors, portable phones, personal data assistants (PDAs), personal computers (PCs), set-top PCs, tablet PCs, electronic frames, kiosks, and so on. Further, 3D display technology may be applied and not only for home use, but also in various fields in which 3D imaging is requested such as science, pharmacy, design, education, advertising, computer game, and so on. The 3D display system may be mainly classified into a glasses-free system that allows viewing without requiring glasses, and a glass system that has one wear glasses.

The glass system may provide satisfactory 3D feelings; however, a user may be inconvenienced as he or she is to wear the glasses. The glasses-free system provides an advantage in which 3D image can be viewed without the glasses. Thus, discussion regarding development of the glasses-free system continues.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide a multi view image display apparatus that provides a clear 3D image by expanding normal viewing area according to a cyclic mapping method, and a control method thereof.

According to an aspect of an exemplary embodiment, there is provided a multi view image display apparatus including an image inputter configured to receive an image, a display configured to display a multi view image that is generated based on the received image, and a processor configured to render views having different viewpoints based on a depth of the received image, expand a normal viewing area based on a cyclic mapping, adjust pixel values of the views so that a view jumping amount of a view jumping area occurring on a reverse viewing area due to the expansion of the normal viewing area is equal to a value, and generate the multi view image based on the adjusted pixel values.

The display may include a display panel configured to display the multi view image, and a view field divider disposed on a front face of the display panel, the view field diver being configured to provide optical views having different viewpoints on a viewing area of a user, and a number of the views may be greater than a number of the optical views.

The processor may be further configured to expand the normal viewing area on an epipolar domain that is generated based on an epipolar image including uniform pixel lines of each of the views.

The processor may be further configured to calculate a number of views to be used to expand the normal viewing area, and a depth difference between the views, based on the depth of the received image, and render the views based on the calculation.

The processor may be further configured to smooth a depth difference between views occurring on the view jumping area, and generate the multi view image further based on the smoothed depth difference.

The processor may be further configured to calculate a threshold slope so that the view jumping amount of the view jumping area is equal to the value, based on a depth difference between the views that are provided on the normal viewing area, process the received image with at least one among a depth slope of the received image and the threshold slope, based on a difference between the depth slope and the threshold slope, and generate the multi view image based on the processed image.

The multi view image display apparatus may further include a storage configured to store a threshold slope that is determined so that the view jumping amount of the view jumping area is equal to the value, based on a depth difference between the views that are provided on the normal viewing area, and the processor may be further configured to process the received image with at least one among a depth slope of the received image and the threshold slope, based on a difference between the depth slope and the threshold slope, and generate the multi view image based on the processed image.

The processor may be further configured to determine whether the depth slope is greater than the threshold slope, and process the received image with the threshold slope, in response to the processor determining that the depth slope is greater than the threshold slope.

The processor may be further configured to determine whether the depth slope is greater than the threshold slope, and whether the multi view image display apparatus operates in a display mode maintaining the depth slope, and compensate a depth slope of the reverse viewing area with the threshold slope, in response to the processor determining that the depth slope is greater than the threshold slope, and that the multi view image display apparatus operates in the display mode.

The processor may be further configured to determine whether the depth slope is less than the threshold slope, and expand the normal viewing area based on the depth slope of the received image, in response to the processor determining that the depth slope is less than the threshold slope.

The multi view image display apparatus may further include a user interface configured to receive a user command, and the processor may be further configured to expand the normal viewing area based on the cyclic mapping and a 3D feeling that is determined based on the user command.

According to an aspect of another exemplary embodiment, there is provided a control method of a multi view image display apparatus, the method including rendering views having different viewpoints based on a depth of an image that is received, expanding a normal viewing area based on a cyclic mapping, adjusting pixel values of the views so that a view jumping amount of a view jumping area occurring on a reverse viewing area due to the expansion of the normal viewing area is equal to a value, generating the multi view image based on the adjusted pixel values, and displaying the multi view image.

The control method may further include providing optical views having different viewpoints on a viewing area of a user, and a number of the views may be greater than a number of the optical views.

The expanding may include expanding the normal viewing area on an epipolar domain that is generated based on an epipolar image including uniform pixel lines of each of the views.

The control method may further include calculating a number of views to be used to expand the normal viewing area, and a depth difference between the views, based on the depth of the received image, and the rendering may include rendering the views based on the calculating.

The control method may further include smoothing a depth difference between views occurring on the view jumping area, and the generating may include generating the multi view image further based on the smoothed depth difference.

The control method may further include calculating a threshold slope so that the view jumping amount of the view jumping area is equal to the value, based on a depth difference between the views that are provided on the normal viewing area, and processing the received image with at least one among a depth slope of the received image and the threshold slope, based on a difference between the depth slope and the threshold slope. The generating may include generating the multi view image based on the processed image.

The control method may further include storing a threshold slope that is determined so that the view jumping amount of the view jumping area is equal to the value, based on a depth difference between the views that are provided on the normal viewing area, and processing the received image with at least one among a depth slope of the received image and the threshold slope, based on a difference between the depth slope and the threshold slope. The generating may include generating the multi view image based on the processed image.

According to an aspect of another exemplary embodiment, there is provided a multi view image display apparatus including a processor configured to render different views of an image based on a depth of the image, expand a normal viewing area of the views based on a cyclic mapping, adjust pixel values of the views so that a view jumping amount occurring on a reverse viewing area of the views due to the expansion of the normal viewing area is equal to a value, and generate the multi view image based on the adjusted pixel values. The multi view image display apparatus further includes a display configured to display the multi view image.

The processor may be further configured to determine whether a depth slope of the normal viewing area is greater than a threshold slope, and whether the multi view image display apparatus operates in a display mode maintaining the depth slope, compensate a depth slope of the reverse viewing area with the threshold slope, in response to the processor determining that the depth slope is greater than or equal to the threshold slope, and that the multi view image display apparatus operates in the display mode, and expand the normal viewing area based on the depth slope of the normal viewing area, in response to the processor determining that the depth slope is less than the threshold slope.

BRIEF DESCRIPTION OF THE DRAWINGS

The above and/or other aspects will be more apparent by describing exemplary embodiments with reference to the accompanying drawings, in which.

DETAILED DESCRIPTION OF EXEMPLARY EMBODIMENTS

Figure 1A:
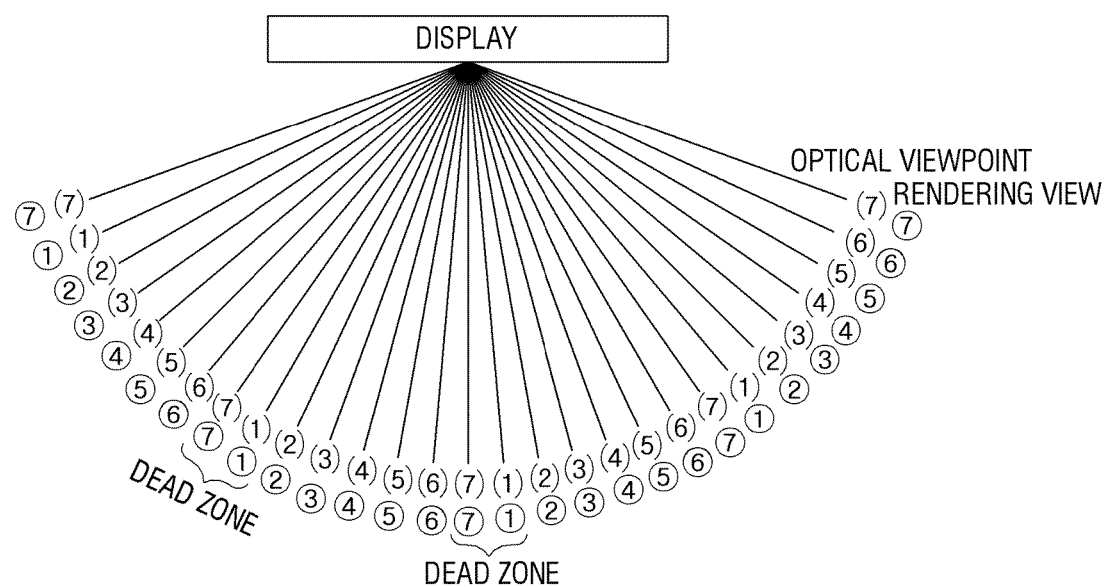
FIGS. 1A, 1B, and 1C are diagrams illustrating an operation of a multi view image display apparatus according to a linear mapping method according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

Figure 1B:
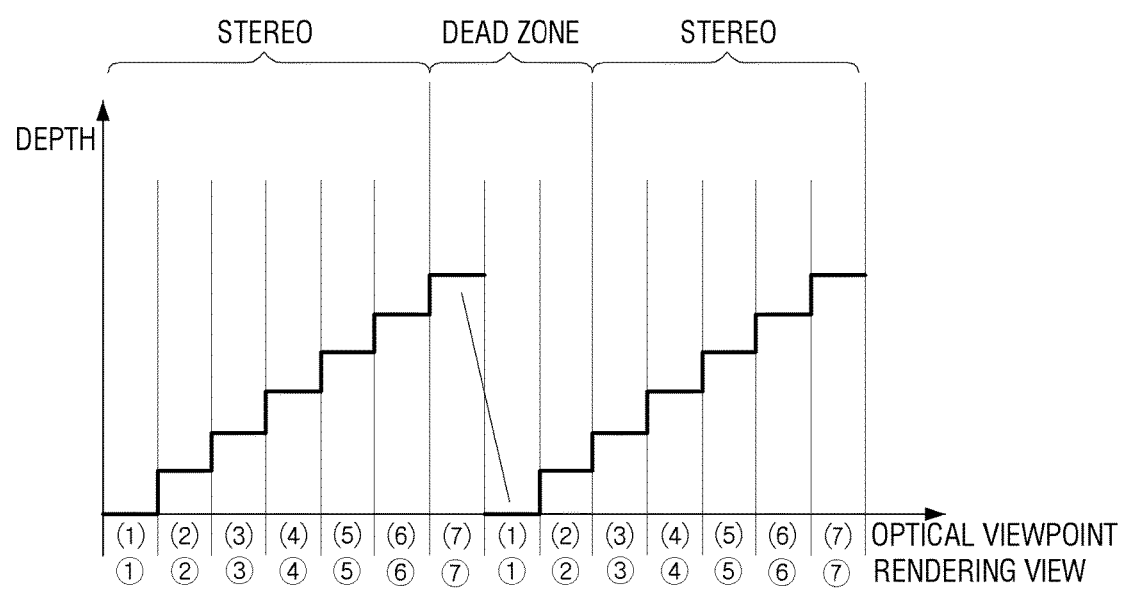
Figure 1C:
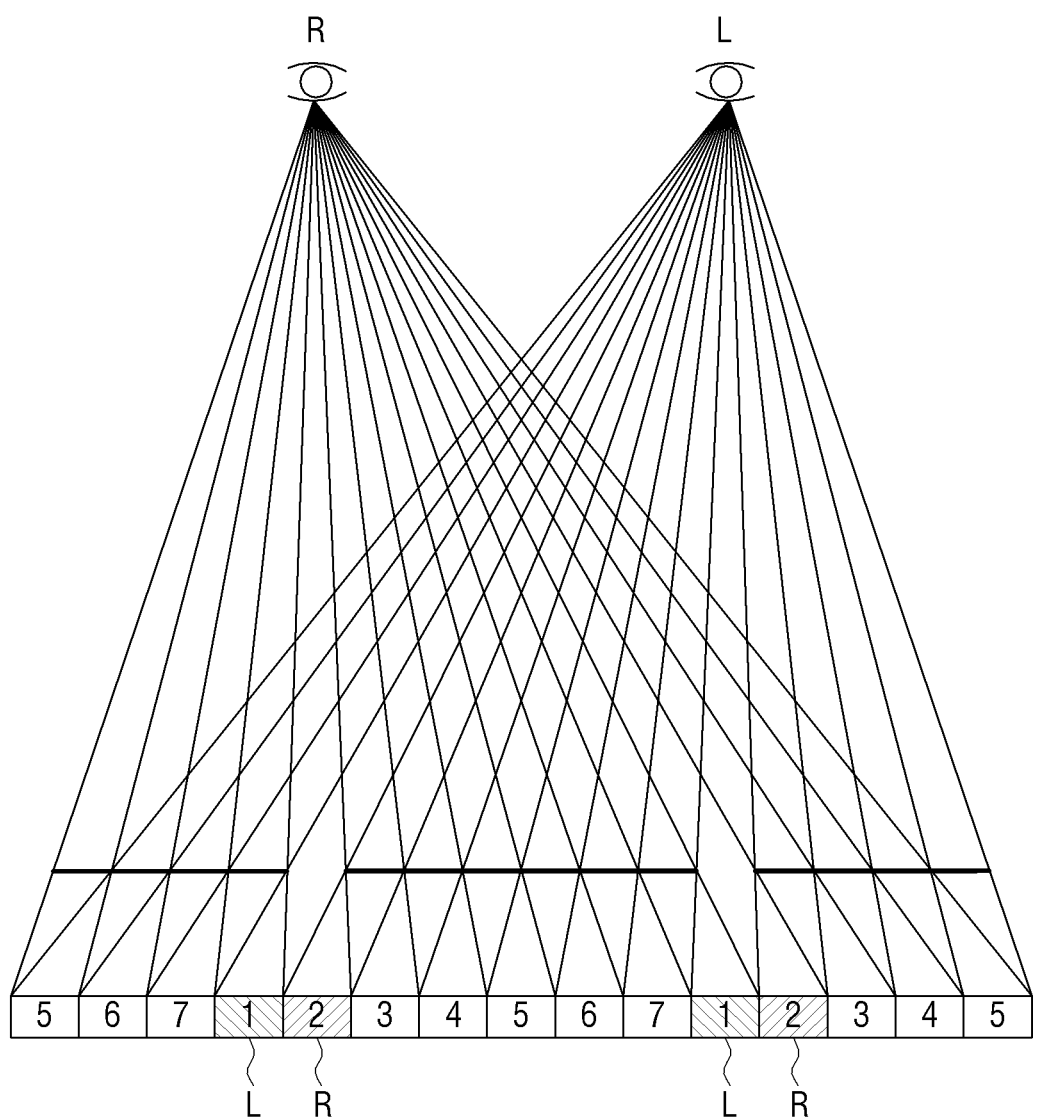

FIGS. 1A, 1B, and 1C are diagrams illustrating an operation of a multi view image display apparatus according to a linear mapping method according to an exemplary embodiment.

When a glasses-free system acquires a plurality of optical views, the system may generate a plurality of views by rendering the inputted image, and provide the multi view image generated by using a plurality of views. Herein, a plurality of views may respectively be each viewpoint image, or several viewpoint images may make up one view. For example, when seven optical views are provided with seven viewpoint images, one view may correspond to one viewpoint image. When seven optical views are provided with N number of viewpoint images, one view may consist of M (M≥1) viewpoint images.

The multi view image is the image generated for display purpose through the view mapping technology, and the view mapping method for generating the multi view image includes a linear mapping method and a cyclic mapping method.

The linear mapping method involves matching a plurality of views having different viewpoints from each other, for example, matching views from viewpoint 1 to viewpoint 7 with the optical views according to an order of 1, 2, 3, 4, 5, 6, 7, 1, 2, 3, . . . , as illustrated in FIGS. 1A and 1B.

FIG. 1C illustrates an operation of a multi view image display apparatus for providing the 3D image according to the linear mapping method.

As illustrated, a plurality of images photographed from different viewpoints from each other may be refracted by different angles from each other, and the focused image may be provided on a position displaced by a distance (e.g., about 3 m) that is a so-called 'viewing distance.' The position where the image is formed is referred to as a 'viewing area' (or 'optical view'). Thereby, when one eye of a user (or a viewer) is positioned on a first viewing area and another eye is positioned on a second viewing area, the 3D feeling is obtained.

For example, referring to FIG. 1C, a glasses-free 3D display apparatus may project the light corresponding to viewpoint image 1 among 7 viewpoints to the left eye and the light corresponding to viewpoint image 2 to the right eye. Thereby, a user can experience 3D feeling because he or she can view the images having different viewpoints from each other with his or her left and right eyes.

However, the linear mapping method has a problem of the dead zone that may occur according to viewing positions. Herein, the 'dead zone' refers to a position where the viewing position of a user is changed from viewpoint 7 to viewpoint 1. On the dead zone, the serious crosstalk may occur due to the rapid changes of the disparity (i.e., jumping phenomenon) and 3D images cannot be viewed. Further, a user may feel the visual fatigue. Thus, the position where viewpoint 7 and viewpoint 1 are simultaneously viewed, is the dead zone.

The cyclic mapping method is method for arranging the views according to the order of 1, 2, 3, 4, 3, 2, 1, which may produce an effect of alleviating the rapid changes of the disparity that occurs in the linear mapping method.

Figure 2A:
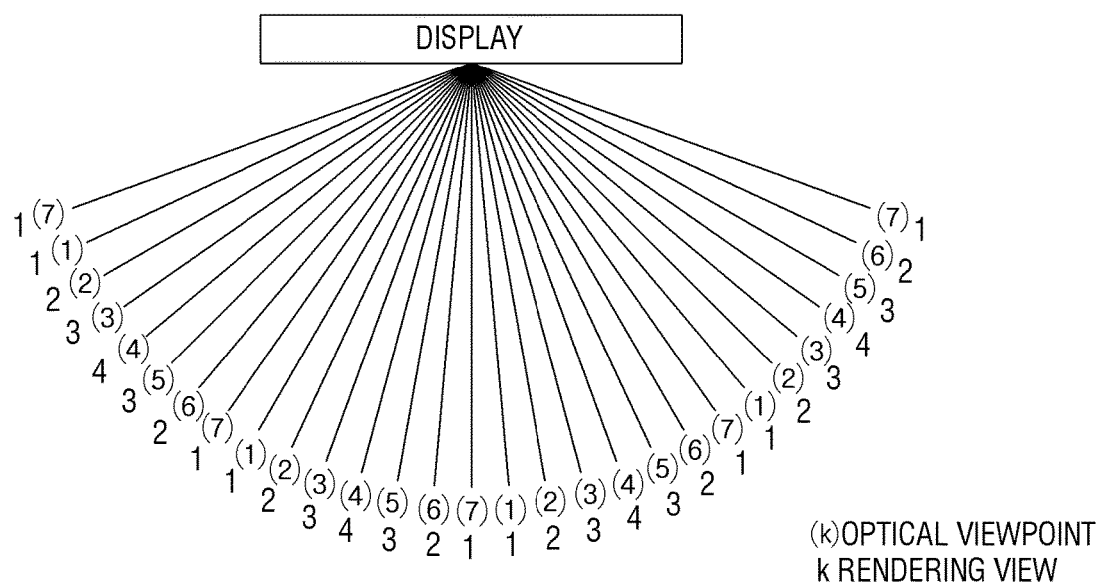
FIGS. 2A and 2B are diagrams illustrating an operation of a 3D display apparatus according to a cyclic mapping method according to an exemplary embodiment.
Figure 2B:
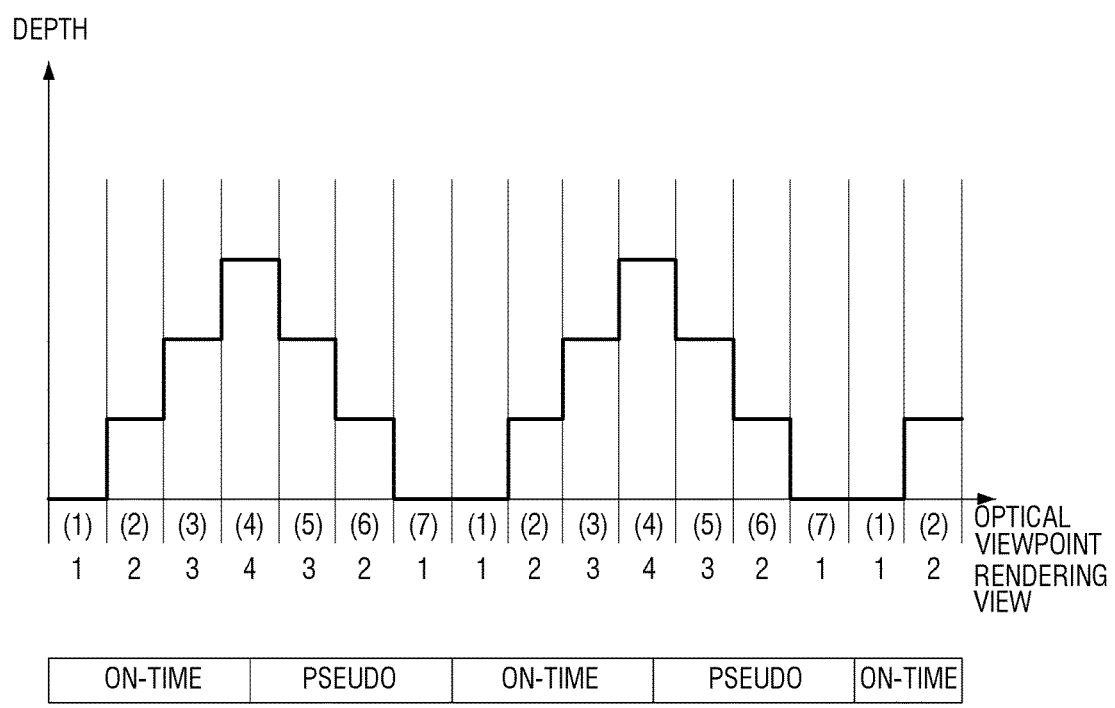

FIGS. 2A and 2B are diagrams illustrating an operation of a 3D display apparatus with a cyclic mapping method according to an exemplary embodiment.

Referring to FIGS. 2A and 2B, the multi view image may be generated according to the cyclic mapping method to solve a problem according to the linear mapping method illustrated in FIGS. 1A and 1B.

To generate a multi view image by using N number of views, a multi view image may be generated for display purpose, by sequentially arranging from viewpoint 1 to viewpoint N/2, and then reversely arranging from viewpoint N/2−1 to viewpoint 1, and repeating such pattern. In this case, when N is odd number, the viewpoint corresponding to an integer greater than N/2 (or an integer smaller than N/2) may be the time point of changing the sequential order arrangement and the reverse order arrangement.

For example, as illustrated in FIG. 2B, when a multi view image is generated by using views having 7 different viewpoints from each other in total, viewpoint 4, which corresponds to integer 4 that is greater than 7/2, may be the time point of change. Thus, the plurality of views may be arranged in such an arrangement pattern that repeats the pattern in which the views are sequentially arranged from viewpoint 1 to viewpoint 4 and reversely arranged from viewpoint 3 to viewpoint 1. However, the exemplary embodiments are not limited herein. Accordingly, the multi view image may be generated by using an arrangement pattern, according to which a pattern of sequentially arranging either the odd or the even viewpoints from viewpoint 1 to viewpoint N, and reversely arranging either the odd or the even viewpoints from viewpoint N to viewpoint 1, repeats. For example, when a plurality of views is 7 viewpoints in total, a multi view image may be generated by repeating a pattern of viewpoints 1, 3, 5, 7, 6, 4, 2.

When the multi view image is arranged according to the cyclic mapping method as illustrated in FIG. 2A, a reverse viewing section where the viewpoints are arranged reversely may be generated. For example, the optical view 1 to 4 sections in which views 1 to 4 are sequentially arranged, may correspond to normal viewing sections, and the optical view 4 to 7 sections in which views 1 to 4 are reversely arranged, may correspond to the reverse viewing sections. On the reverse viewing section in which the viewpoints are reversely arranged, the images observed by the both eyes of a human may be switched from left to right. Thus, the viewing fatigue, e.g., the queasy sickness, may be experienced. The following will explain exemplary embodiments in which the viewing fatigue can be reduced as much as possible by decreasing the reverse viewing section as much as possible and reducing the queasy sickness.

FIGS. 3A, 3B, 3C, and 3D are diagrams illustrating a constitution of a multi view image display apparatus according to exemplary embodiments.

Figure 3A:
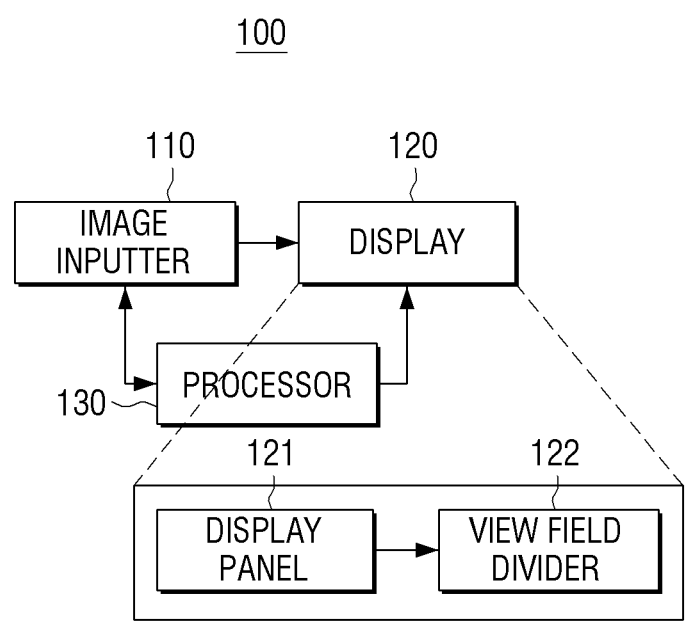
FIGS. 3A, 3B, 3C, and 3D are diagrams illustrating a constitution of a multi view image display apparatus according to exemplary embodiments.

FIG. 3A is a block diagram illustrating a constitution of a multi view image display apparatus 100 according to an exemplary embodiment.

Referring to FIG. 3A, the multi view image display apparatus 100 includes an image inputter 110, a display 120, and a processor 130.

The multi view image display apparatus 100 may be implemented as various types of display apparatuses such as TV, monitor, PC, kiosk, tablet PC, electronic frame and portable phone.

The image inputter 110 receives an image. The image inputter 110 may receive an image from various external devices such as external storing medium, broadcasting station, web server, and so on. Herein, the 'inputted image' may be any one image among a single view image, a stereoscopic image and a multi view image. The single view image may be photographed by a photographing device, and the stereoscopic image may be a 3D video image expressed only with the left-eye image and the right-eye image and photographed by a stereo photographing device. The stereo photographing device may be a photographing device including two lenses, and used for photographing the 3D image. Further, the 'multi view image' indicates three-dimensional video image providing users with various viewpoints in various directions, by correcting the photographing images photographed through more than one photographing device geometrically, followed by spatial synthesis, and so on.

Further, the image inputter 110 may receive depth information of the image. The depth of the image refers to the depth value allocated per pixel of the image. For example, an 8 bit-depth may have the grayscale value from 0 to 255. For example, when expressing based on the black/white reference, the black color (low value) may indicate the farther position from a user and the white color (high value) may indicate the closer position to a user.

The depth information may be information indicating the depth of the 3D image, and it corresponds to the binocular disparity between the left-eye image and the right-eye image constituting the 3D image. The degree of the 3D feeling sensed by a human may be different according to the depth information. Thus, when the depth is greater, the binocular disparity between the left and the right eye may be increased. Thus, relatively greater 3D feeling can be sensed. When the depth is less, the binocular disparity between the left and the right eye may become less. Thus, a relatively less 3D feeling can be sensed. The depth information may be obtained with the passive method such as stereo matching in which only two-dimensional characteristics of the image are used, and the active method in which the device such as depth camera is used. The depth information may be a depth map form. The 'depth map' indicates a table including the depth information per area of the image. The area may be divided based on a pixel unit, or defined to be a preset area greater than the pixel unit. According to an exemplary embodiment, the depth map may be a form in which a value smaller than 127 or 128 is expressed to be negative (−) and a value greater than 127 or 128 is expressed to be positive (+), based on 127 or 128 as a standard value among the grayscale values 0-255, i.e., based on the zero standard (or the focal plane). The standard value of the focal plane may be arbitrarily selected from 0-255. Herein, the negative value indicates sinking and the positive value indicates projecting.

The display 120 may perform a function of providing a plurality of optical views (or viewing areas). For the above, the display 120 includes a display panel 121 to provide a plurality of optical views and a view field divider 122.

The display panel 121 includes a plurality of pixels consisting of a plurality of sub pixels. Herein, the sub pixels may consist of R (Red), G (Green), and B (Blue). Thus, the display panel 121 may be configured by arranging the pixels consisting of R, G, B of sub pixels toward a plurality of lines and columns. In this case, the display panel 121 may be implemented as various display units such as a liquid crystal display (LCD) panel, a plasma display panel (PDP), an organic light emitting diode (OLED), a vacuum fluorescent display (VFD), a field emission display (FED), and an electro luminescence display (ELD).

The display panel 121 may display image frames. The display panel 121 may display the multi view image frame in which a plurality of views having different viewpoints from each other is repeatedly arranged sequentially.

When the display panel 121 is implemented as an LCD panel, the display apparatus 100 may further include a back light to provide the back light on the display panel 121 and a panel driver to drive the pixels of the display panel 121 according to pixel values of the pixels constituting the image frame.

The view field divider 122 may be arranged on the front face of the display panel 121 to provide different viewpoints per viewing area, i.e., may provide the optical views. In this case, the view field divider 122 may be implemented as a lenticular lens or parallax barrier.

For example, the view field divider 122 may be implemented as a lenticular lens including a plurality of lens areas. Thereby, the lenticular lens may refract the image displayed on the display panel 121 through a plurality of lens areas. Each lens area may be formed in a size corresponding to at least one pixel. Thus, the light penetrating through each pixel may be differently distributed per viewing area.

For another example, the view field divider 122 may be implemented as a parallax barrier. The parallax barrier may be implemented as a transparent slit array including a plurality of barrier areas. Thereby, by blocking the light with the slit between the barrier areas, the images having different viewpoints from each other per viewing area may be emitted.

Figure 3B:
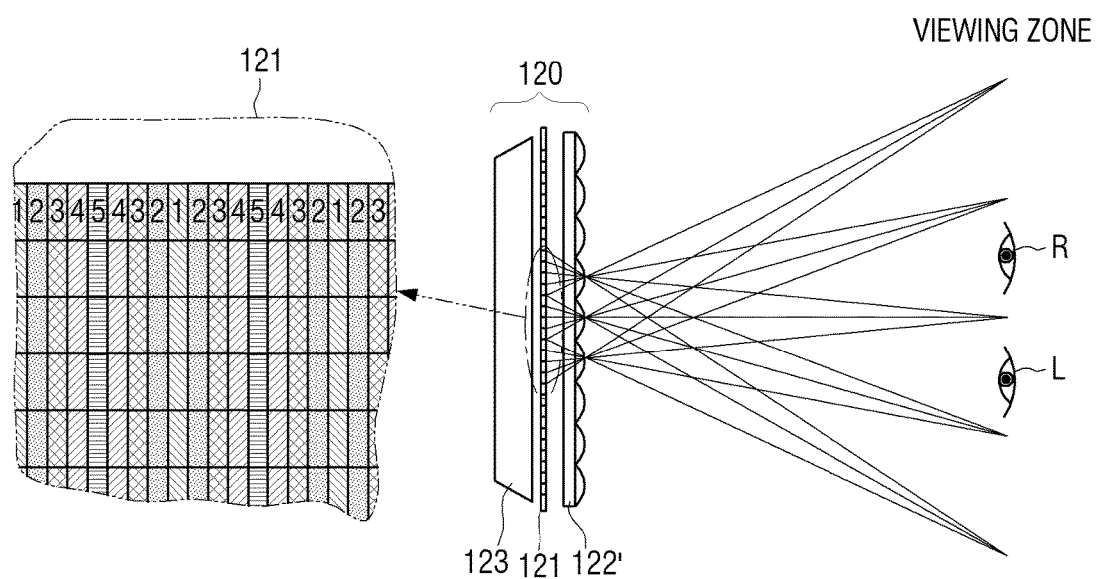

FIG. 3B explains that the view field divider 122 is implemented as lenticular lens array according to an exemplary embodiment.

Referring to FIG. 3B, the display 120 includes a display panel 121, a lenticular lens array 122' and a back light 123.

In FIG. 3B, the display panel 121 includes a plurality of pixels that are divided into a plurality of columns. The images having different viewpoints from each other may be arranged per column. Referring to FIGS. 2A, 2B, and 3B, a plurality of images 1, 2, 3, 4, 5 having different viewpoints from each other is sequentially repeated and arranged in a cyclic form. Thus, each pixel column corresponding to the normal viewing area (or normal viewing section) may be arranged to be numbered groups 1, 2, 3, 4, 5. The graphic signals applied on the panel may be arranged such that the pixel column 1 displays a first image and the pixel column 2 displays a second image.

The back light 123 may provide the light to the display panel 121. With the light provided from the back light 123, the images 1, 2, 3, 4, 5 formed on the display panel 121 may be respectively emitted through the lenticular lens array 122', and the light of the images 1, 2, 3, 4, 5 emitted through the lenticular lens array 122' may be distributed and delivered to a user. Thus, the lenticular lens array 122' may generate the exit pupils at a user position, i.e., at the viewing distance. As illustrated, the depth and the diameter of the lens when being implemented as a lenticular lens array, or the interval of the slits when being implemented as a parallax barrier, may be designed so that the exit pupils generated by each column can be separated by an average binocular central distance less than 65 mm. The separated image lights may respectively form the viewing area. Thus, as illustrated in FIG. 3B, when a plurality of optical views are formed on the viewing area and when the left eye and the right eye of a user are positioned on the different optical views from each other, the 3D image can be viewed.

The view field divider 122 may operate while tilting at an angle to enhance the image quality. The processor 130 may divide a plurality of rendered views respectively based on the tilting angle of the view field divider 122, and combine a plurality of divided views and generate a multi view image frame to be outputted. Thereby, a user may not view the displayed image in a vertical direction or a horizontal direction to the sub pixels of the display panel 121, but may view the area tilting in a direction. Thus, a user may view part of each sub pixel rather than viewing the entire sub pixel. For example, when assuming that 5 viewpoints are provided, the outputted image may be rendered so that the pixel values are outputted, in which at least a part among a plurality of sub pixels corresponds to a plurality of views, as illustrated in FIG. 3D. In this case, when the right eye of a user views viewpoint 1 image and the left eye views viewpoint 2 image, the right eye of a user may view the tilting area 10 corresponding to viewpoint 1 and the left eye may view the tilting area 20 corresponding to viewpoint 2. However, FIG. 3D illustrates an example of the rendered image. Accordingly, the number of views, the rendering pitch, and so on, may be variously implemented according to exemplary embodiments.

Referring again to FIG. 3A, the processor 130 may control overall operation of the display apparatus 100.

First, the processor 130 may render a plurality of views having different viewpoints from each other.

When the inputted image is 2D image, the processor 130 may render a plurality of views having different viewpoints from each other based on the depth information extracted from 2D/3D conversion. Further, when N number of views having different viewpoints from each other and N number of the corresponding depth information are inputted, the processor 130 may render the multi view image based on at least one image and depth information among N number of the inputted views and depth information. When only the N number of views having different viewpoints from each other are inputted, the processor 130 may extract the depth information from N number of views and render the multi view image based on the extracted depth information.

For example, the processor 130 may generate a left-most side view and a right-most side view as the bases for the multi view image, by selecting one as standard view (or center view) among 3D images, i.e., among the left-eye images and the right-eye images. In this case, the processor 130 may generate the left-most side view and the right-most side view based on the compensated depth information corresponding to one of the left-eye images and right-eye images that is selected as the standard view. When the left-most side view and the right-most side view are generated, the processor 130 may render the multi view image by generating a plurality of interpolating views between the center view and the left-most side view, and generating a plurality of interpolating views between the center view and the right-most side view. However, the exemplary embodiments are not limited herein. Accordingly, the processor may generate extrapolation views according to the extrapolation method. When the multi view image is rendered based on 2D image and the depth information, the 2D image may be selected as a center view.

The above-described rendering operation is one of exemplary embodiments. Other various methods may render a plurality of views, in addition to the rendering operation described above. Depending on cases, the processor 130 may adjust the depth of the inputted image based on the depth information according to various standards. In this case, the processor 130 may render a plurality of views based on the image in which the depth is adjusted.

The processor 130 may generate a multi view image to be displayed on the display 120 based on sub pixel values constituting a plurality of rendered views having different viewpoints from each other.

The processor 130 may divide each of a plurality of rendered views according to the tilting angle of the view field divider 122, and combine the views in the cyclic mapping form and generate a multi view image to be outputted.

The processor 130 may generate a multi view image by expanding the normal viewing area (or normal viewing section) according to the cyclic mapping method described above, and adjusting pixel values constituting a plurality of views so that the view jumping amount of the view jumping area occurring at the reverse viewing area (or reverse viewing section) according to the expansion of the normal viewing area meets a preset threshold value. Herein, the 'preset threshold value' may be determined to be a value at which the view jumping is not noticeable by a user, and it may be obtained by experiment. The 'view jumping area' is the area where the viewpoint difference in the views occurring between the reverse viewing area and the normal viewing area becomes greater according to the expansion of the normal viewing area.

According to an exemplary embodiment, the processor 130 may generate a multi view image by expanding the normal viewing area on the epipolar domain that is generated based on the epipolar images consisting of uniform pixel lines of each of a plurality of rendered views, and adjusting pixel values constituting a plurality of views so that the view jumping amount of the view jumping area occurring on the reverse viewing area according to the expansion of the normal viewing area meets a preset threshold value.

According to another exemplary embodiment, the processor 130 may render a plurality of views based on a number of views and the depth difference between the views so that the normal viewing area can be expanded at the time of rendering a plurality of views, and generate a multi view image based on pixel values constituting a plurality of rendered views. The processor 130 may calculate a number of views and the depth difference between the views so that the normal viewing area can be expanded according to the cyclic mapping method based on the depth of the inputted images, and render a plurality of views based on the calculated depth difference. In this case, a multi view image may be generated on the epipolar domain without requiring a separate image processing.

The processor 130 may calculate a threshold slope value corresponding to the depth difference between a plurality of views having different viewpoints from each other provided on the normal viewing area based on the preset threshold value that is established so that the view jumping amount of the view jumping area is not noticeable to a user, as described above.

In this case, the processor 130 may generate a multi view image by processing the inputted image with at least one among the depth slope of the inputted image and the calculated threshold slope, based on the difference between the depth slope of the inputted image and the calculated threshold slope.

Further, the processor 130 may generate a multi view image by processing the inputted image with the calculated threshold slope value, when the depth slope of the inputted image is greater than the calculated threshold slope value.

Further, the processor 130 may compensate only the depth slope of the reverse viewing area with the calculated threshold slope value, when the depth slope of the inputted image is greater than the calculated threshold slope value, but when operation is in a display mode (e.g., movie play mode) that maintains the depth slope of the inputted image.

Further, the processor 130 may additionally expand the reverse viewing area according to the depth slope of the inputted image, when the depth slope of the inputted image is smaller than the calculated threshold slope value.

Further, the processor 130 may expand the normal viewing area according to the cyclic mapping method based on the 3D feeling established by a user command, calculate the threshold slope of the normal viewing area based on the preset threshold value of the view jumping area occurring according to the expansion, and generate a multi view image based on the calculation.

Further, the processor 130 may generate a multi view image by smoothing the depth difference between the views occurring on the view jumping area of the epipolar image. In this case, the processor 130 may adjust the smoothing strength based on the depth difference between the views included in the view jumping area, and edge information included in the view jumping area. For example, when the depth difference between the views is greater or when there are many edges included in the view jumping area, the smoothing strength may be increased.

The processor 130 may combine pixel values of both viewpoint views corresponding to the view jumping area occurring between the reverse viewing area and the next normal viewing area according to the cyclic mapping method, and smooth the view jumping area by mapping the combined pixel values with the corresponding viewpoint view. In this case, the processor 130 may calculate the combined pixel values on a sub pixel unit among R, G, B, and smooth the corresponding area by mapping the calculated combined pixel values with the corresponding sub pixel area.

For example, when the view jumping occurs between view 3 and view 1, the processor 130 may combine R sub pixel value corresponding to view 3 with R sub pixel value corresponding to view 1, and calculate the combined pixel value. Thus, the processor 130 may process the smoothing by mapping the calculated value with R sub pixel corresponding to view 3 and R sub pixel corresponding to view 1.

In this case, the processor 130 may calculate the combined pixel value by applying a preset weight on the pixel area to be smoothed. Herein, the preset weight may be differently established based on the depth difference between the views included in the view jumping area, and the edge information included in the view jumping area.

Further, the viewpoint view involved in the calculation of the combined pixel value may include the adjacent viewpoint view as well as viewpoint view corresponding to the view jumping area. For example, when the view jumping occurs between view 3 and view 1, the processor 130 may calculate the combined pixel value by applying the preset weight on, not only view 3, but also the sub pixel area corresponding to view 2 and view 4 that are views adjacent to view 3. Herein, the preset weight may be applied in a form such as Laplacian filter, Gaussian filter, smoothing filter, and so on.

In this case, the processor 130 may establish the two-dimensional or the three-dimensional area near the view jumping area that may be smoothed in the epipolar domain, and calculate the combined pixel value by applying the preset weight on the established area. Thus, in view of the characteristics of the epipolar domain, when the three-dimensional area is established based on a sub pixel area of the selected viewpoint view of the epipolar domain, the processor 130 may establish an area that includes the source pixel area respectively corresponding to a viewpoint view and adjacent viewpoint views.

Further, the processor 130 may calculate a combined pixel value applied with the preset weight, by applying a preset filter on the three-dimensional area established in the epipolar domain. Herein, the preset filter may be bilinear interpolation form, although exemplary embodiments are not limited herein.

Figure 3C:
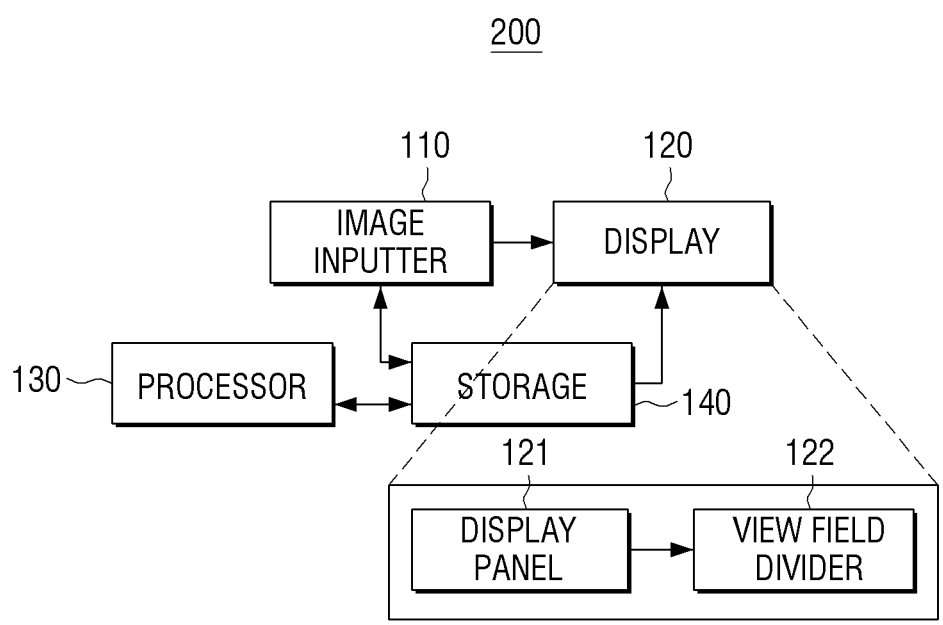
Figure 3D:
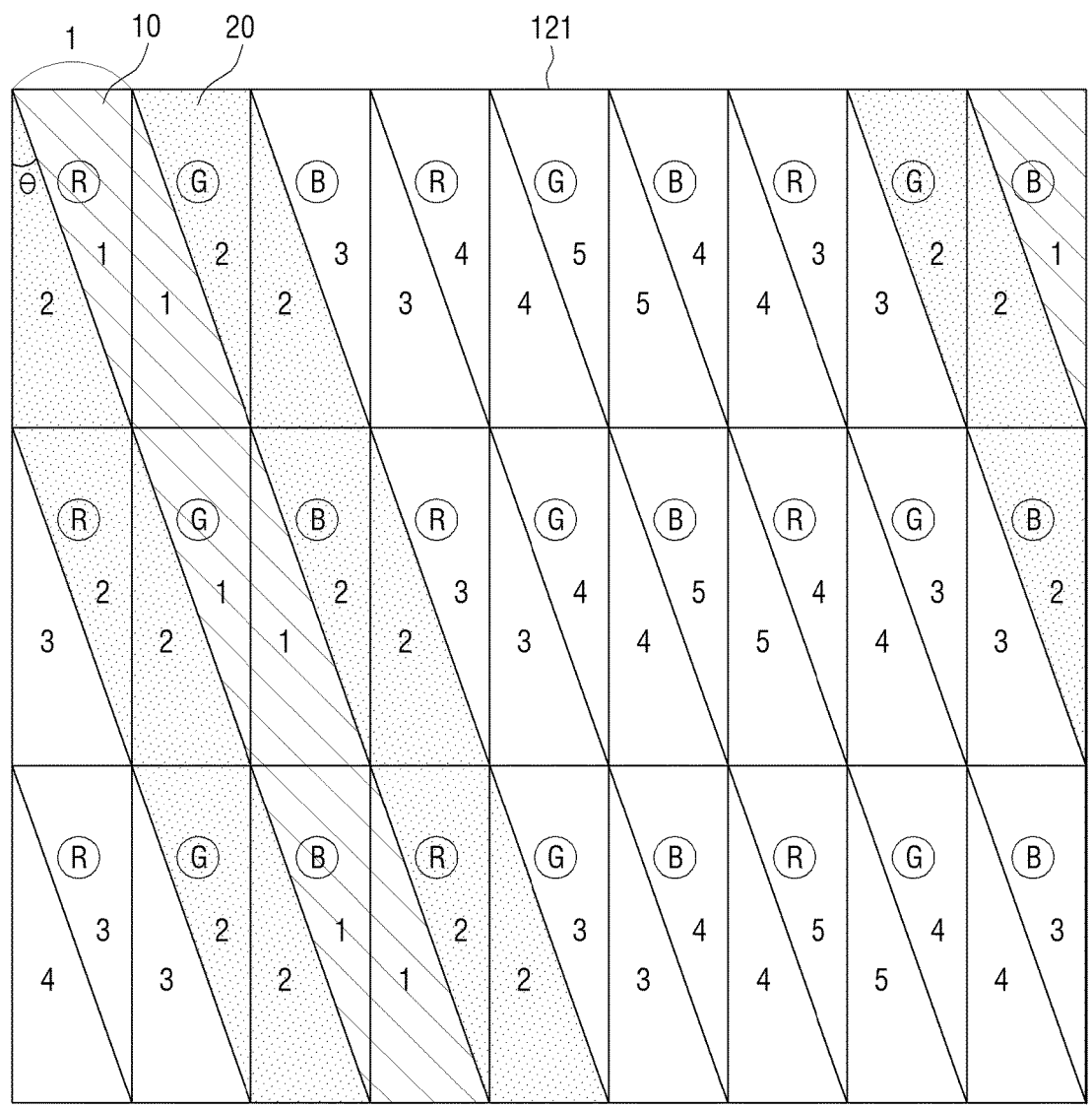

FIG. 3C is a block diagram illustrating a constitution of a multi view image display apparatus 200 according to another exemplary embodiment.

Referring to FIG. 3C, the multi view image display apparatus 200 includes the image inputter 110, the display 120, the processor 130, and a storage 140. The image inputter 110, the display 120, and the processor 130 illustrated in FIG. 3C are identical to those illustrated in FIG. 3A, and these will not be further explained below for the sake of brevity.

The storage 140 may store information regarding the depth amount at which a user cannot notice the view jumping on the view jumping area, and the corresponding threshold value may be obtained by experiment.

Further, the storage 140 may store the threshold slope value corresponding to the depth difference between a plurality of views having different viewpoints from each other provided on the normal viewing area so that the view jumping amount of the view jumping area meets a preset threshold value. The storage 140 may store the threshold slope value corresponding to the depth difference between a plurality of views having different viewpoints from each other provided on the normal viewing area, per depth of the inputted image (or per depth of the object).

In this case, the processor 130 may generate a multi view image by processing the inputted image with at least one among the depth slope of the inputted image and the threshold slope based on the difference between the depth slope of the inputted image and the threshold slope stored on the storage 140.

Further, when the depth slope of the inputted image is greater than the threshold slope value, the processor 130 may generate a multi view image by processing the inputted image with the threshold slope value.

Further, when the depth slope of the inputted image is greater than the threshold slope, but when operation is in a display mode (e.g., movie play mode) that maintains the depth slope of the inputted image, the processor 130 may compensate only the depth slope of the reverse viewing area with the threshold slope value.

Further, when the depth slope of the inputted mage is smaller than the threshold slope value, the processor 130 may additionally expand the normal viewing area according to the depth slope of the inputted image.

Further, the processor 130 may generate a multi view image so that the normal viewing area according to the cyclic mapping method is expanded based on the 3D feeling established according to a user command inputted through a user interface. For example, when a user establishes the desired 3D feeling, the processor 130 may expand or reduce the normal viewing area according to the 3D feeling established by a user.

Further, the user interface may provide a menu for selecting whether or not to apply a function according to an exemplary embodiment. The user interface may also provide a menu for selecting whether or not to apply a function according to at least one among contents type, viewing time, and users.

Further, the storage 140 may store information regarding each of the depth sections to provide the uniform 3D feeling to a user (JNDD: Just Noticeable Difference in Depth). For example, when 8 bit-depth has 0-255 grayscale values, values within a range may be noticed to be uniform depth, rather than that each of the values within 0-255 is noticed by the user with different 3D feeling. The depth values in 0-8 sections may provide the uniform 3D feeling to a user, and the depth values in 9-16 sections may provide another uniform 3D feeling to a user. Herein, the information regarding each depth section providing the uniform 3D feeling to a user can be obtained by experiment.

In this case, the processor 130 may utilize the JNDD described above, when determining the preset threshold value at which the user does not notice the view jumping. For example, when determining the non-noticeable value regarding the view jumping obtained by experiment, the preset threshold value may be established with the depth value distanced away from the focal plane on the depth section providing the uniform 3D feeling.

Figure 4:
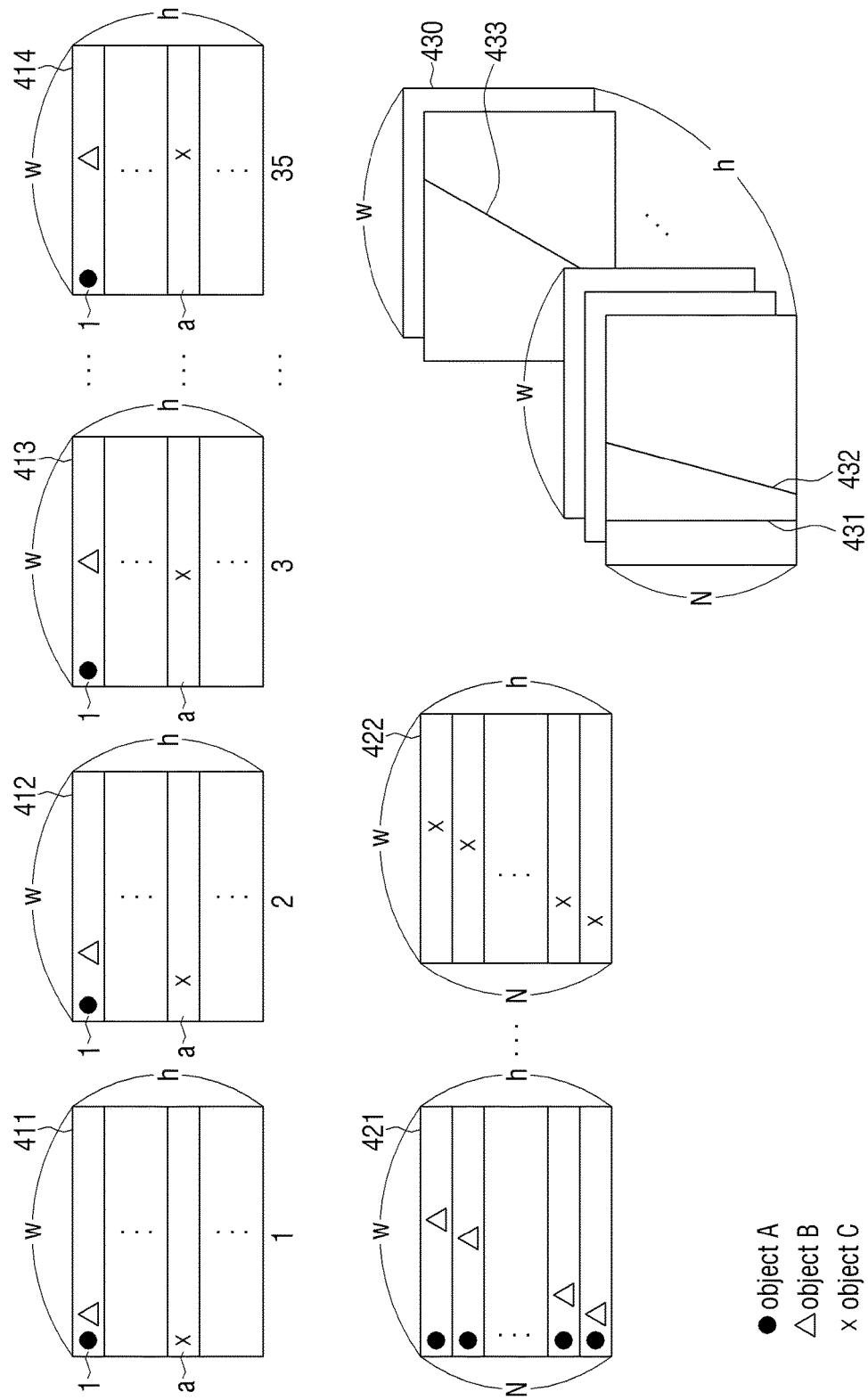
FIG. 4 is a diagram illustrating a method for generating epipolar images according to an exemplary embodiment.

FIG. 4 is a diagram illustrating a method for generating epipolar images 430 according to an exemplary embodiment.

Referring to FIG. 4, it is assumed that 5 multi view images having height h and width w are rendered.

In this case, the epipolar image corresponding to each pixel line may be generated by combining each pixel line of each of the 5 multi view images 411 to 414. As illustrated, a first image 421 may be generated by combining a first pixel line of each of the 5 multi view images 411 to 414, and an a-th image 422 may be generated by combining an a-th pixel line of each of the 5 multi view images 411 to 414. The epipolar images 430 may be generated by sequentially combining h number of the generated images corresponding to the number of pixel lines.

In this case, a preset form of lines may appear in the image corresponding to each pixel line according to the depth size of the object, i.e., the depth size of the pixel area. For example, regarding the object A (●), the positions are uniform to each other in 5 multi view images because the depth is zero. However, regarding the object B (Δ), the positions may be gradually modified in N number of the multi view images because the depth has the preset size, and such position modification may appear in a preset line form 432. Referring to the drawing, the line corresponding to the object A (●) having the zero depth value may appear to be a vertical form 431. The lines corresponding to the object B (Δ) and the object C (×) having the preset size of depth value may appear as a skewed diagonal form 433.

Figure 5A:
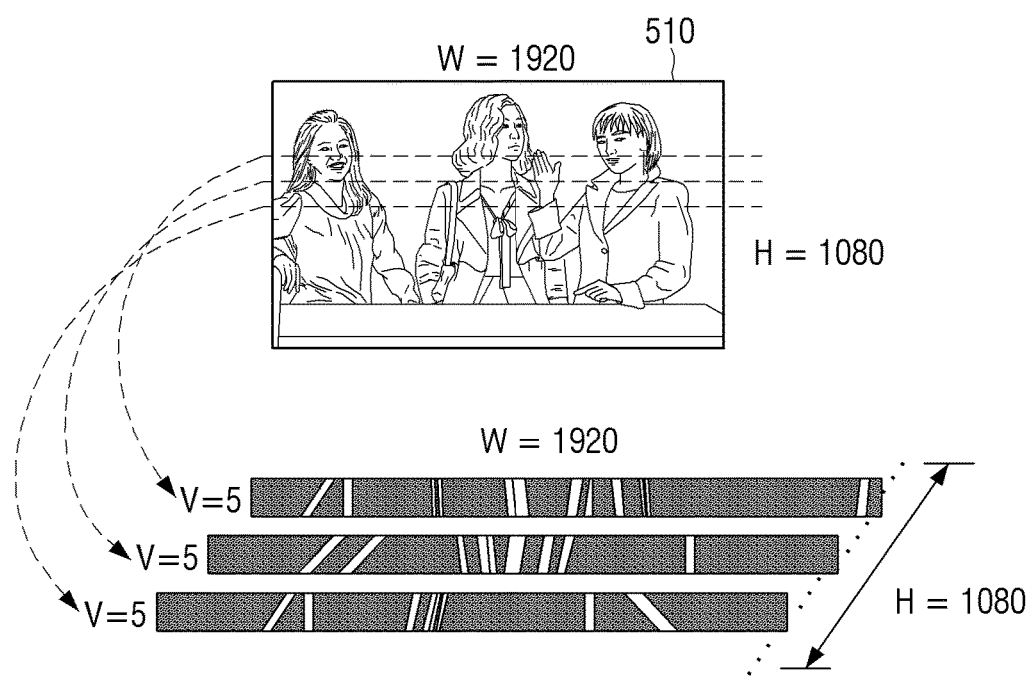
FIGS. 5A and 5B are diagrams illustrating a method for generating an epipolar domain according to an exemplary embodiment.
Figure 5B:
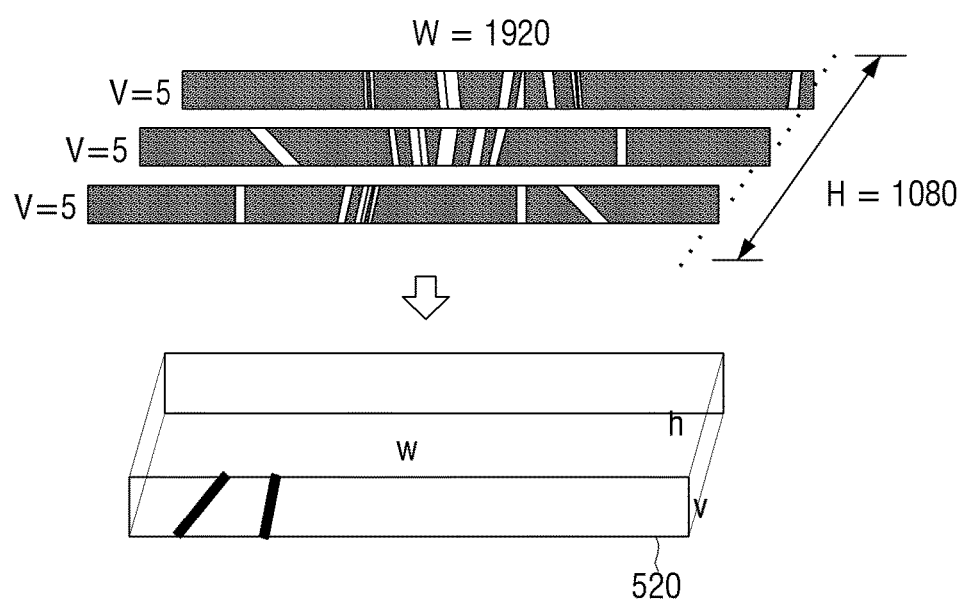

FIGS. 5A and 5B are diagrams illustrating a method for generating an epipolar domain 520 according to an exemplary embodiment.

Referring to FIG. 5A, the epipolar image consisting of the uniform pixel line of an image 510 having the width w=1920 and the height h=1080 may be generated regarding each pixel line, and the 1080 generated epipolar images respectively corresponding to the pixel lines may be combined. Thus, the epipolar domain 520 illustrated in FIG. 5B may be generated.

Figure 6:
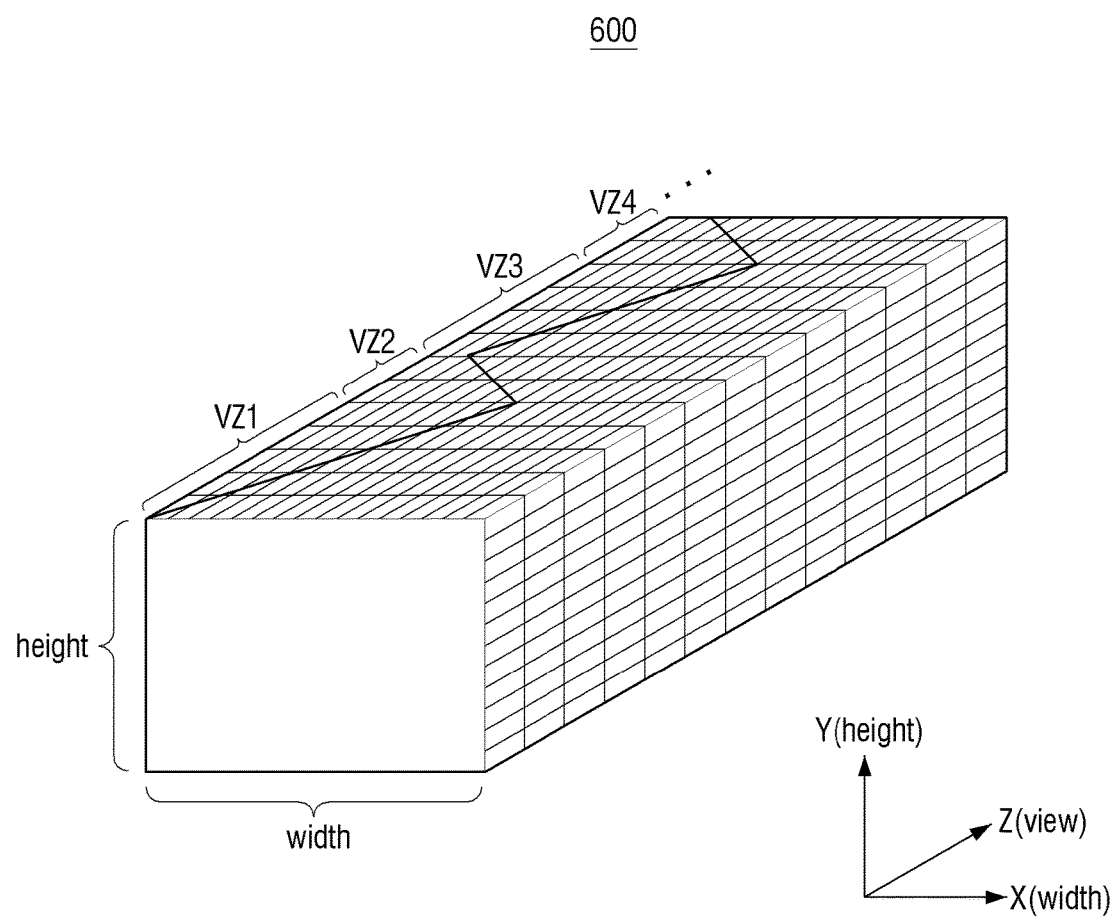
FIG. 6 is a diagram illustrating an epipolar domain constructed with a cyclic mapping method according to an exemplary embodiment.

FIG. 6 is a diagram illustrating an epipolar domain 600 constructed with a cyclic mapping method according to an exemplary embodiment.

Referring to FIG. 6, the epipolar domain 600 may be in a form in which a plurality of rendered views having different viewpoints from each other is respectively arranged in a Z axis (view axis). Further, the width and the height of each view may constitute a X axis and a Y axis (width axis and height axis), respectively. Thus, the image combining the uniform pixel lines of each of a plurality of views may constitute the X-Z axes, i.e., the width-view axes. For example, the uniform pixel lines of each of a plurality of views may constitute the Z axis, i.e., the view axis.

Thereby, when the epipolar domain configured with the cyclic mapping method is viewed from the Z axis (view axis), the image may be obtained, in which the depth increases in view 1 zone (VZ1) of the normal viewing area, the depth decreases on view 2 zone (VZ2) of the reverse viewing area, the depth increases on view 3 zone (VZ3) of the normal viewing area, and the depth decreases on view 4 zone (VZ4) of the reverse viewing area. Thus, the image illustrated in FIG. 7 may be obtained.

FIGS. 7, 8, 9A, 9B, 9C, 10A, and 10B are diagrams illustrating a method for expanding a normal viewing area according to an exemplary embodiment.

Figure 7:
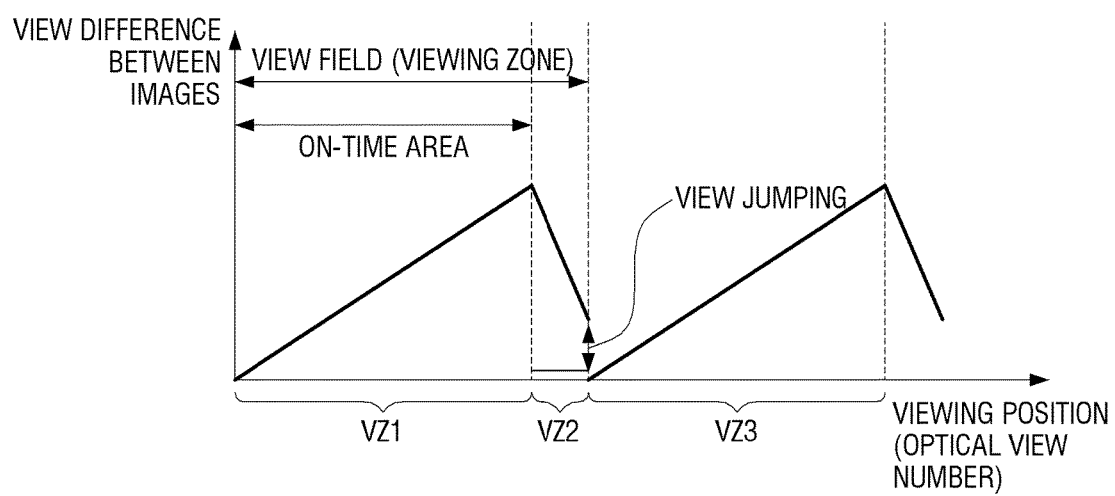
FIGS. 7, 8, 9A, 9B, 9C, 10A, and 10B are diagrams illustrating a method for expanding a normal viewing area according to an exemplary embodiment.

FIG. 7 is a diagram illustrating an image viewed from one side of the epipolar domain according to an exemplary embodiment.

Referring to FIG. 7, the rendered views may be respectively arranged in a form in which the view difference increases, on the VZ1 of the normal viewing area. According to an exemplary embodiment, the reverse viewing area where the fatigue occurs relatively can be reduced by expanding the normal viewing area differently from the cyclic mapping method.

However, as illustrated, when expanding the VZ1 of the normal viewing area, the view jumping may occur between the VZ2 of the adjacent reverse viewing area and the VZ3 of the normal viewing area.

Figure 8:
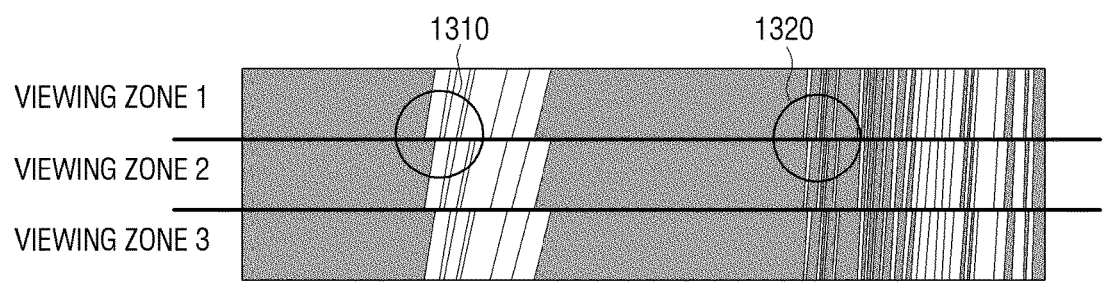

As illustrated in FIG. 8, the view jumping area may be large on a pixel area 1310 where the 3D feeling is great, and may be small on a pixel area 1320 where the 3D feeling is little.

However, the view jumping area on the pixel area where the 3D feeling is great may correspond to the dead zone in which 3D cannot be viewed normally. Thus, the corresponding area may be smoothed.

Figure 9A:
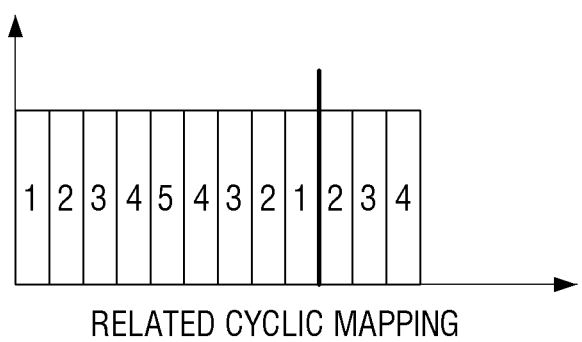
Figure 9B:
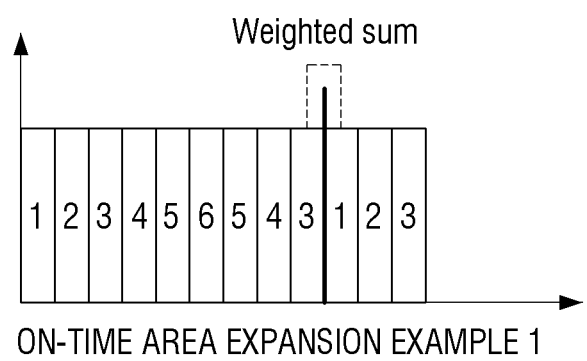
Figure 9C:
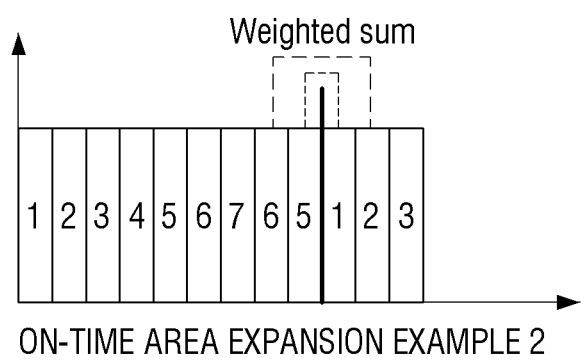

FIGS. 9A to 9C are diagrams illustrating a method for expanding the normal viewing area according to an exemplary embodiment.

FIG. 9A is a diagram illustrating a view mapping method according to the cyclic mapping method. As illustrated, views 1 to 5 may be sequentially mapped in the direction in which the viewpoint increases, sequentially mapped in the direction in which the viewpoint decreases, and sequentially mapped again in the direction in which the viewpoint increases. A multi view image may be generated by repeating the above process.

FIG. 9B is a diagram illustrating a view mapping method according to the modified cyclic mapping method. As illustrated, views 1 to 6 may be sequentially mapped in the direction in which the viewpoint increases by expanding the normal viewing area, sequentially mapped in the direction in which the viewpoint decreases, and sequentially mapped in the direction in which the viewpoint increases. A multi view image may be generated by repeating the above sequential mapping. In this case, due to the reduction of the reverse viewing area, views 6 to 3 (FIG. 9B) or views 7 to 5 (FIG. 9C) may be only sequentially mapped on the reverse viewing area. Thus, in the mapping method of FIG. 9B, the view jumping area may occur between view 3 and view 1 where the next normal viewing area starts. Likewise, in the mapping method of FIG. 9C, the view jumping area may occur between view 5 and view 1 where the next normal viewing area starts.

Thereby, smoothing between the views may be processed on the area where the view jumping occurs. The smoothing may be performed by combining pixel values of the both viewpoint views corresponding to the view jumping area occurring between the reverse viewing area and the next normal viewing area according to the cyclic mapping method, and mapping the combined pixel values with the corresponding viewpoint views. For example, referring to FIG. 9B, the smoothing may be performed on the corresponding jumping area by combining a pixel value corresponding to view 3 and a pixel value corresponding to view 1, calculating the combined pixel value, and mapping again the calculated value with view 3 and view 1. In this case, the processor 130 may calculate the combined pixel value by applying the preset weight on the pixel area where the smoothing will be processed. Because the smoothing method performed on the view jumping area is already described above, this will not be further explained below for the sake of brevity.

Figure 10A:
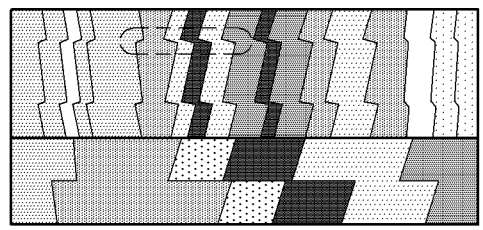
Figure 10B:
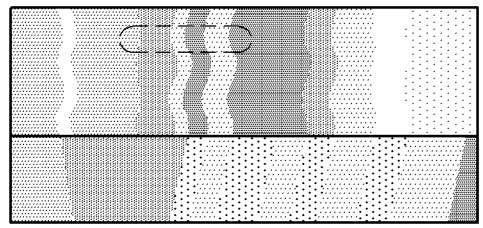

FIG. 10A illustrates the epipolar image before the view smoothing process, and FIG. 10B illustrates the epipolar image after the view smoothing process. As illustrated, the interval between the views is not greatly noticeable on the view jumping area after the smoothing process. Thus, the fatigue can be reduced when viewing 3D.

FIGS. 11A, 11B, 12A and 12B are diagrams illustrating a method for expanding a normal viewing area according to another exemplary embodiment.

Figure 11A:
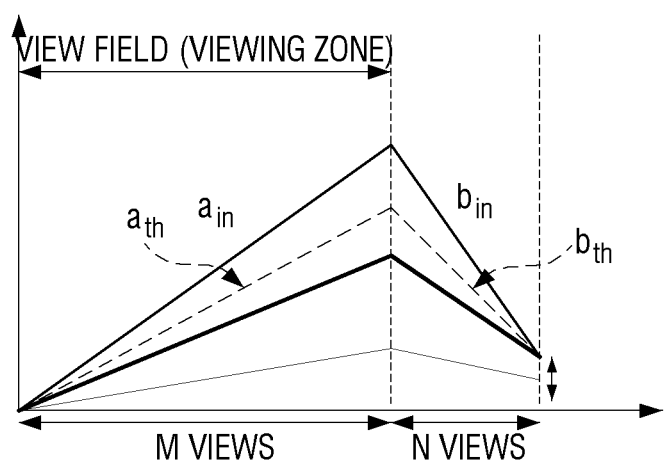
FIGS. 11A, 11B, 12A, and 12B are diagrams illustrating a method for expanding a normal viewing area according to another exemplary embodiment.

Referring to FIG. 11A, $a_{in}$ is the slope corresponding to the 3D feeling of the inputted image, and $a_{th}$ is the preset threshold slope that is previously established for the expansion of the normal viewing area.

As illustrated in FIG. 11A, when the slope $a_{in}$ corresponding to the 3D feeling of the inputted image is equal to or greater than the preset threshold slope $a_{th}$, $a_{in}$ may be changed into $a_{th}$, and $b_{in}$ may be changed into b±, so that the adverse effects according to the expansion of the normal viewing area is minimized.

Figure 12A:
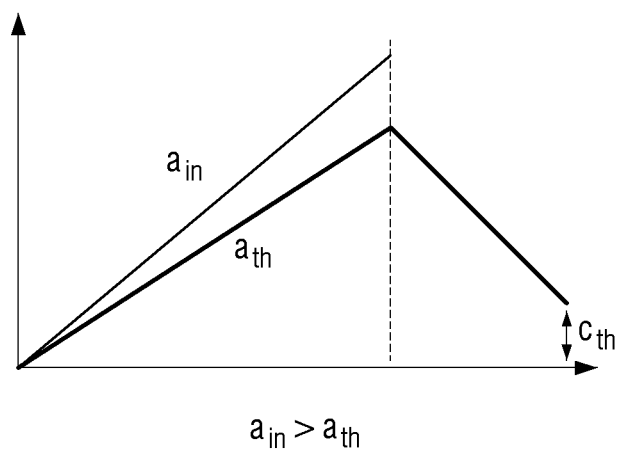
Figure 12A:
Figure 12A:
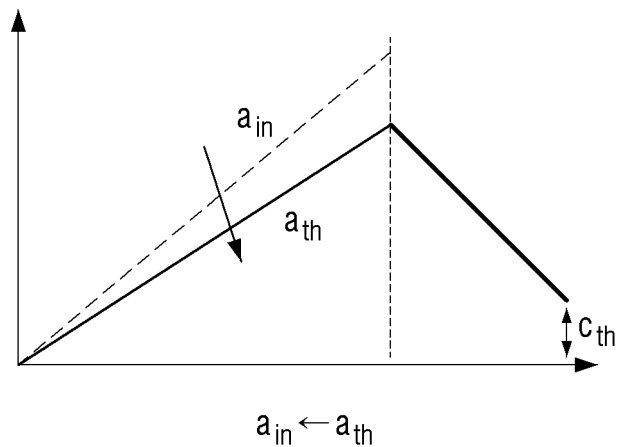

For example, as illustrated in FIG. 12A, the slope $a_{in}$ of the normal viewing area corresponding to the 3D feeling of the inputted image may be adjusted to be threshold slope $a_{th}$. Further, the slope of the reverse viewing area may be established correspondingly. In this case, the viewing fatigue on the view jumping area can be reduced by maintaining $c_{th}$, which is a preset threshold value, so that the view jumping is not noticeable to a user on the view jumping area.

Figure 11B:
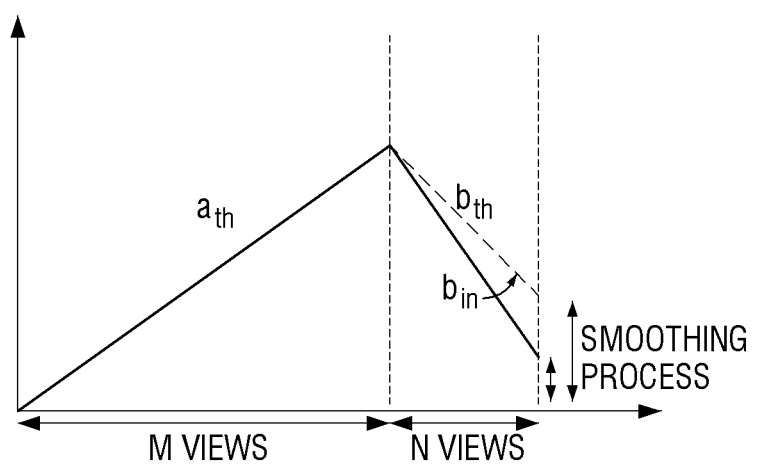

However, when the 3D feeling of the inputted image is desired to be maintained according to the characteristic of the contents (e.g., in the case of movie contents), $a_{th}$ may be used as is, as illustrated in FIG. 11B. In this case, when $b_{in}$ is also used, the depth difference of the reverse viewing area may be great and the viewing fatigue can be greatly sensed. Thus, $b_{in}$ may be modified to be $b_{th}$, and the smoothing between the views on the view jumping area may be performed. Herein, the smoothing amount may be determined to be $|b_{in}-b_{th}|$ or $|b_{in}(M+N)-Vmax|$. In this case, M is a number of views included in the normal viewing area, N is a number of views included in the reverse viewing area, and Vmax is a maximum number of views.

Figure 12B:
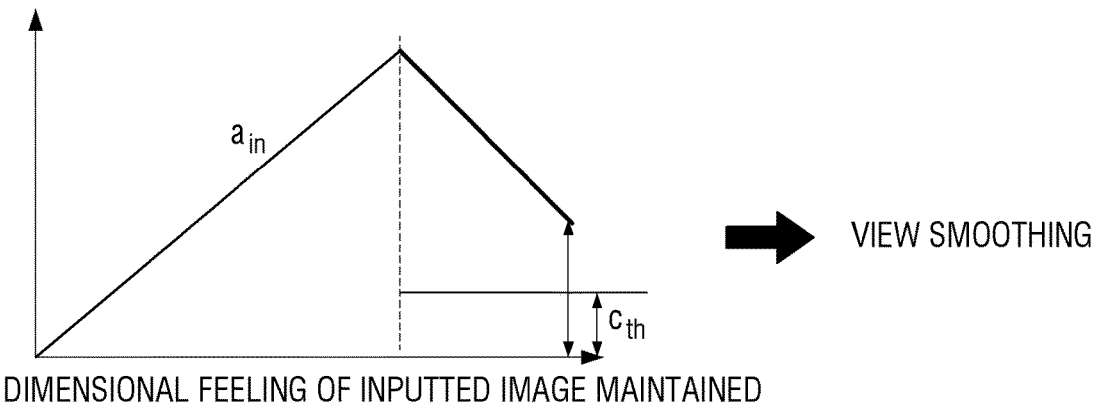

For example, when the slope $a_{in}$ of the normal viewing area corresponding to the 3D feeling of the inputted image is equal to or greater than the preset threshold value $a_{th}$ as illustrated in FIG. 12B, if $a_{in}$ is maintained, the view jumping amount of the view jumping area may exceed the preset threshold value $c_{th}$. Thus, a user may sense excessive fatigue on the corresponding area. In this case, the view jumping sections may be connected smoothly by performing the smoothing on the corresponding view jumping area, and the viewing fatigue can be reduced.

When b(M+N) is less than Vmax, the slope b and the slope a may be set identical to each other.

Figure 13A:
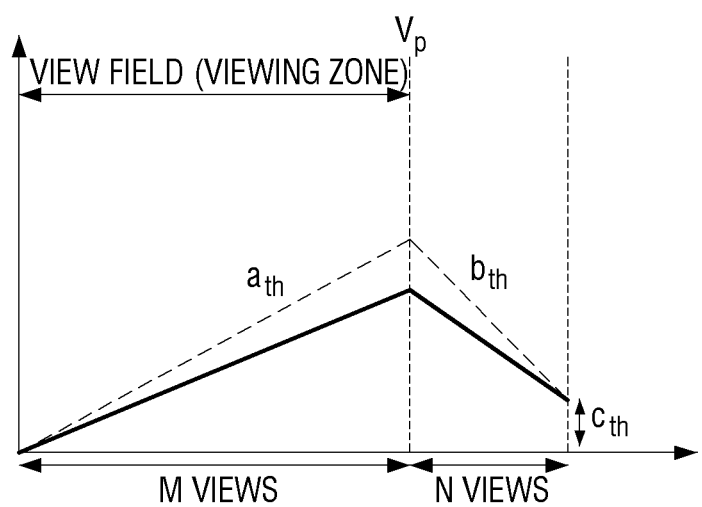
FIGS. 13A and 13B are diagrams illustrating a method for expanding a normal viewing area according to another exemplary embodiment.
Figure 13B:
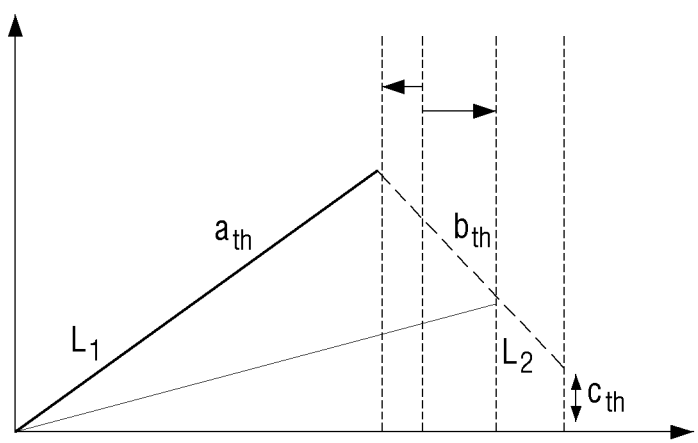

FIGS. 13A and 13B are diagrams illustrating a method for expanding a normal viewing area according to another exemplary embodiment.

Referring to FIGS. 13A and 13B, while the threshold slope $b_{th}$ of the reverse viewing area is maintained, the slope $a_{th}$ of the normal viewing area, and the size of the normal viewing area may be variably adjusted.

For example, when the slope $b_{in}$ of the reverse viewing area corresponding to the 3D feeling of the inputted image is equal to or greater than the preset threshold slope $b_{th}$, as illustrated in FIG. 13B, the normal viewing area may be reduced. Further, when $b_{in}$ is less than $b_{th}$, the normal viewing area may be expanded. Herein, the amount of reduced normal viewing area may be determined based on the an intersecting point between the line L1 and the line L2.

Further, to prevent the optical view $V_p$ from shaking in a temporal direction, the temporal smoothing filter of value 'a' according to a following mathematical expression may be applied.

$$\text{Smoothing Filter: } a_t = \sum_{i=-k}^{k} w_{t+i} \cdot a_{t+i} \qquad \text{[Mathematical Expression 1]}$$

Figure 14A:
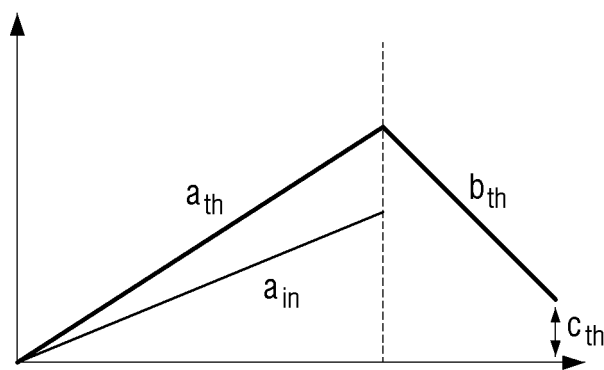
FIGS. 14A and 14B are diagrams illustrating a method for adjusting a normal viewing area according to another exemplary embodiment.
Figure 14A:
Figure 14A:
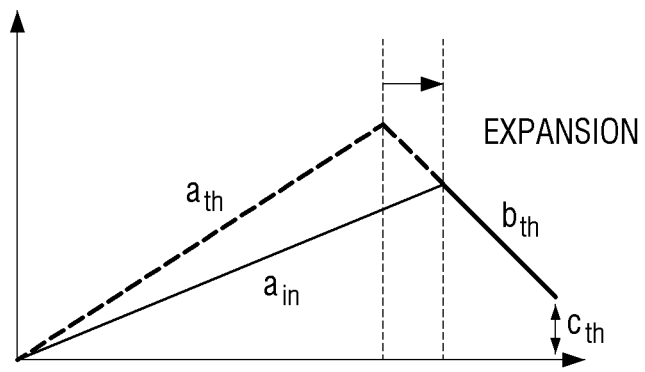
Figure 14B:
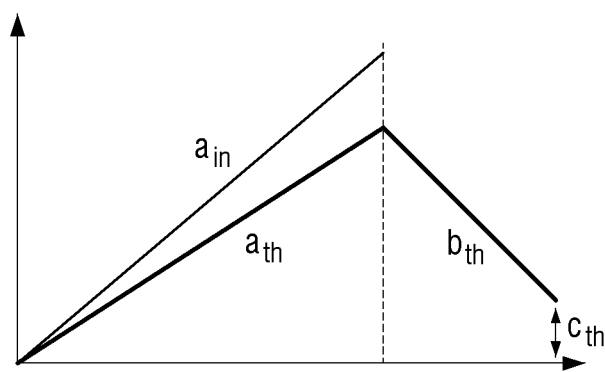
Figure 14B:
Figure 14B:
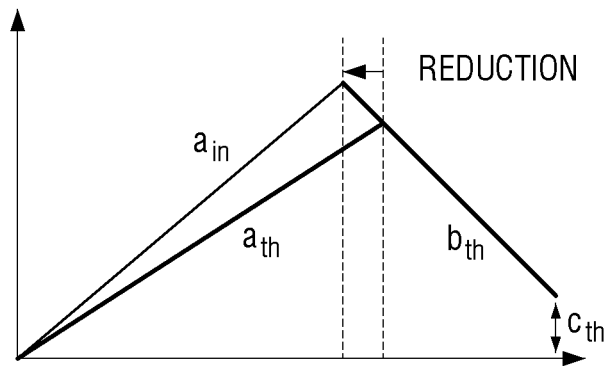

FIGS. 14A and 14B are diagrams illustrating a method for adjusting a normal viewing area according to another exemplary embodiment.

Referring to FIG. 14A, when the slope $a_{in}$ of the normal viewing area corresponding to the 3D feeling of the inputted image is less than the preset threshold slope $a_{th}$, the normal viewing area may be additionally expanded. The normal viewing area may be expanded toward a point where the slope $a_{in}$ meets the preset threshold slope $b_{th}$ of the reverse viewing area.

Further, referring to FIG. 14B, when the slope $a_{in}$ of the normal viewing area corresponding to the 3D feeling of the inputted image is equal to or greater than the preset threshold slope $a_{th}$ and, when $a_{in}$ is maintained (e.g., movie mode), the normal viewing area may be reduced. The normal viewing area may be reduced toward the point where the slope $a_{in}$ meets the threshold slope $b_{th}$ of the reverse viewing area.

Figure 15:
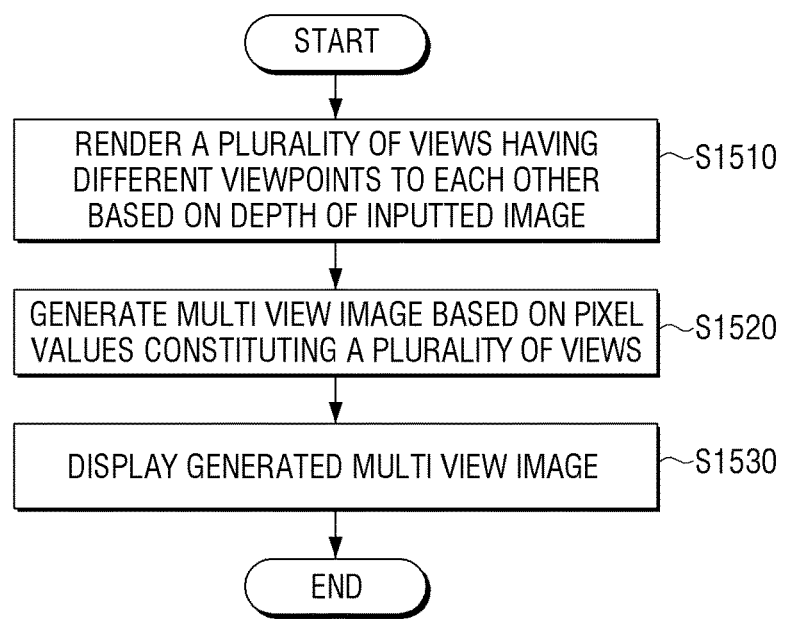
FIG. 15 is a flowchart illustrating a method for controlling a multi view image display apparatus according to an exemplary embodiment.

FIG. 15 is a flowchart illustrating a control method of a multi view image display apparatus according to an exemplary embodiment.

According to the control method of the multi view image display apparatus in FIG. 15, in operation S1510, the multi view image display apparatus renders a plurality of views having different viewpoints to each other based on a depth of an inputted image.

In operation S1520, the multi view image display apparatus generates a multi view image based on pixel values constituting the plurality of views. In this case, the normal viewing area according to the cyclic mapping method may be expanded, and a multi view image may be generated by adjusting pixel values constituting a plurality of views so that the view jumping amount of the view jumping area occurring on the reverse viewing area according to the expansion of the normal viewing area meets a preset threshold value.

In operation S1530, the multi view image display apparatus displays the generated multi view image.

Herein, the multi view image display apparatus may include a display panel displaying the multi view, and a view field divider arranged on the front face of the display panel, to provide optical views having different viewpoints from each other on the viewing area of a user. The number of the plurality of views used in generating a multi view image may be greater than a number of the optical views.

Further, in operation S1520 of generating a multi view image, the normal viewing area may be expanded on the epipolar domain generated based on the epipolar image consisting of uniform pixel lines of each of a plurality of views, and a multi view image may be generated by adjusting pixel values constituting a plurality of views so that the view jumping amount of the view jumping area occurring on the reverse viewing area according to the expansion of the normal viewing area meets preset threshold value.

Further, in operation S1520 of generating a multi view image, a number regarding a plurality of views and the depth difference between the views so that the normal viewing area can be expanded may be calculated based on the depth of the inputted image, a plurality of views may be rendered based on the above calculation, and a multi view image may be generated based on pixel values constituting a plurality of views.

Further, in operation S1520 of generating a multi view image, a multi view image may be generated by performing the smoothing on the depth difference between the views occurring on the view jumping area adaptively.

Further, in operation S1520 of generating a multi view image, the threshold slope value corresponding to the depth difference between a plurality of views having different viewpoints from each other provided on the normal viewing area and established so that the view jumping amount of the view jumping area meets preset threshold value may be calculated. Further, a multi view image may be generated by processing the inputted image with at least one among the depth slope of the inputted image and the threshold slope, based on the difference between the depth slope of the inputted image and the calculated threshold slope.

Further, the multi view image display apparatus may store the threshold slope value, which is established so that the view jumping amount of the view jumping area meets a preset threshold value, and which corresponds to the depth difference between a plurality of views having different viewpoints from each other provided on the normal viewing area. In this case, in operation S1520 of generating a multi view image, a multi view image may be generated by processing the inputted image with at least one among the depth slope of the inputted image and the prestored threshold slope, based on the difference between the depth slope of the inputted image and the prestored threshold slope.

Further, in operation S1520 of generating a multi view image, when the depth slope of the inputted image is greater than the threshold slope, the inputted image may be processed with the threshold slope. However, when the depth slope of the inputted image is greater than the threshold slope value, but when operation is in a display mode that maintains the depth slope of the inputted image, only the depth slope of the reverse viewing area may be compensated with the above threshold slope value.

Further, in operation S1520 of generating a multi view image, when the depth slope of the inputted image is smaller than the threshold slope, the normal viewing area may be additionally expanded according to the depth slope of the inputted image.

According to the above exemplary embodiments, clearer 3D image can be serviced for a user, because while the cyclic mapping method is utilized, the normal viewing section is expanded, and the smooth view transition is provided on the view jumping section that may occur due to the expansion of the normal viewing area.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A multi view image display apparatus comprising:
an image receiver;
a display; and
a processor configured to:
render a plurality of views of different viewpoints, based on a depth of an image received through the image receiver;
expand a normal viewing section, based on a cyclic mapping, the normal viewing section being a section in which viewpoints of views included in the section are increased sequentially;
adjust pixel values of the plurality of views, based on the expanded normal viewing section;
obtain a multi view image, based on the adjusted pixel values; and
control the display to display the multi view image,
wherein a view jumping amount of a view jumping area occurring on a reverse viewing section based on the adjusted pixel values is equal to a predetermined value, and
wherein the reverse viewing section being a section in which viewpoints of views included in the section are decreased sequentially.

2. The multi view image display apparatus of claim 1, wherein the display comprises a display panel configured to display the multi view image, and a view field divider disposed on a front face of the display panel, the view field divider being configured to provide optical views having different viewpoints on a viewing area of a user, and
    a number of the plurality of views is greater than a number of the optical views.

3. The multi view image display apparatus of claim 1, wherein the processor is further configured to expand the normal viewing section on an epipolar domain that is obtained based on an epipolar image comprising uniform pixel lines of each of the plurality of views.

4. The multi view image display apparatus of claim 1, wherein the processor is further configured to:
    calculate a number of views to be used to expand the normal viewing section, and a depth difference between the views, based on the depth of the received image; and
    render the views, based on the number of views and the depth difference.

5. The multi view image display apparatus of claim 1, wherein the processor is further configured to:
    smooth a depth difference between views occurring on the view jumping area; and
    obtain the multi view image, further based on the smoothed depth difference.

6. The multi view display apparatus of claim 1, wherein the processor is further configured to:
    calculate a threshold slope so that the view jumping amount of the view jumping area is equal to a value, based on a depth difference between the views that are provided on the normal viewing section;
    process the received image with at least one among a depth slope of the received image and the threshold slope, based on a difference between the depth slope and the threshold slope; and
    obtain the multi view image, based on the processed image.

7. The multi view image display apparatus of claim 1, further comprising:
    a storage configured to store a threshold slope that is determined so that the view jumping amount of the view jumping area is equal to a value, based on a depth difference between the views that are provided on the normal viewing section,
    wherein the processor is further configured to:
        process the received image with at least one among a depth slope of the received image and the threshold slope, based on a difference between the depth slope and the threshold slope; and
        obtain the multi view image, based on the processed image.

8. The multi view image display apparatus of claim 7, wherein the processor is further configured to:
    determine whether the depth slope is greater than the threshold slope; and
    process the received image with the threshold slope, in response to the processor determining that the depth slope is greater than the threshold slope.

9. The multi view image display apparatus of claim 7, wherein the processor is further configured to:
    determine whether the depth slope is greater than the threshold slope, and whether the multi view image display apparatus operates in a display mode maintaining the depth slope; and
    compensate a depth slope of the reverse viewing section with the threshold slope, in response to the processor determining that the depth slope is greater than the threshold slope, and that the multi view image display apparatus operates in the display mode.

10. The multi view image display apparatus of claim 7, wherein the processor is further configured to:
    determine whether the depth slope is less than the threshold slope; and
    expand the normal viewing section, based on the depth slope of the received image, in response to the processor determining that the depth slope is less than the threshold slope.

11. The multi view image display apparatus of claim 1, further comprising:
    a user interface configured to receive a user command,
    wherein the processor is further configured to expand the normal viewing section, based on the cyclic mapping and a 3D feeling that is determined based on the user command.

12. A control method of a multi view image display apparatus, the method comprising:
    rendering a plurality of views of different viewpoints, based on a depth of an image that is received;
    expanding a normal viewing section, based on a cyclic mapping, the normal viewing section being a section in which viewpoints of views included in the section are increased sequentially;
    adjusting pixel values of the plurality of views, based on the expanded normal viewing section;
    obtaining a multi view image, based on the adjusted pixel values; and
    displaying the multi view image,
    wherein a view jumping amount of a view jumping area occurring on a reverse viewing section based on the adjusted pixel values is equal to a predetermined value, and
    wherein the reverse viewing section being a section in which viewpoints of views included in the section are decreased sequentially.

13. The control method of claim 12, further comprising providing optical views having different viewpoints on a viewing area of a user, and
    wherein a number of the plurality of views is greater than a number of the optical views.

14. The control method of claim 12, wherein the expanding comprises expanding the normal viewing section on an epipolar domain that is obtained based on an epipolar image comprising uniform pixel lines of each of the plurality of views.

15. The control method of claim 12, further comprising calculating a number of views to be used to expand the normal viewing section, and a depth difference between the views, based on the depth of the received image,
    wherein the rendering comprises rendering the views, based on the calculating.

16. The control method of claim 12, further comprising smoothing a depth difference between views occurring on the view jumping area,
    wherein the obtaining the multi view image comprises obtaining the multi view image, further based on the smoothed depth difference.

17. The control method of claim 12, further comprising:
    calculating a threshold slope so that the view jumping amount of the view jumping area is equal to a value, based on a depth difference between the views that are provided on the normal viewing section; and processing the received image with at least one among a depth slope of the image and the threshold slope, based on a difference between the depth slope and the threshold slope, wherein the obtaining the multi view image comprises obtaining the multi view image, based on the processed image.

18. The control method of claim 12, further comprising:

storing a threshold slope that is determined so that the view jumping amount of the view jumping area is equal to a value, based on a depth difference between the views that are provided on the normal viewing section; and processing the received image with at least one among a depth slope of the received image and the threshold slope, based on a difference between the depth slope and the threshold slope, wherein the obtaining the multi view image comprises obtaining the multi view image, based on the processed image.

19. A multi view image display apparatus comprising:

a display; and a processor configured to:

render a plurality of different views of an image, based on a depth of the image;

expand a normal viewing section of views, based on a cyclic mapping, the normal viewing section being a section in which viewpoints of views included in the section are increased sequentially;

adjust pixel values of the plurality of views, based on the expanded normal viewing section;

obtain a multi view image, based on the adjusted pixel values; and control the display the multi view image, wherein a view jumping amount of a view jumping area occurring on a reverse viewing section based on the adjusted pixel values is equal to a predetermined value, and wherein the reverse viewing section being a section in which viewpoints of views included in the section are decreased sequentially.

20. The multi view image display apparatus of claim 19, wherein the processor is further configured to:

determine whether a depth slope of the normal viewing section is greater than a threshold slope, and whether the multi view image display apparatus operates in a display mode maintaining the depth slope;

compensate a depth slope of the reverse viewing section with the threshold slope, in response to the processor determining that the depth slope is greater than or equal to the threshold slope, and that the multi view image display apparatus operates in the display mode; and expand the normal viewing section, based on the depth slope of the normal viewing section, in response to the processor determining that the depth slope is less than the threshold slope.

* * * * *